Patented July 9, 1940

2,207,415

UNITED STATES PATENT OFFICE 2,207,415

THERAPEUTICAL PREPARATION FOR THE PERORAL TREATMENT OF HAY FEVER AND A METHOD FOR THE MANUFACTURE OF SAME

Kurt Rosenwald, New York, N. Y.

No Drawing. Application January 12, 1938, Serial No. 184,589

5 Claims. (Cl. 167—78)

My invention relates to a new therapeutical preparation and to a method for the preparation of same. More particularly, my invention is concerned with a therapeutical preparation for the peroral treatment of hay fever.

As is known, people being sensitive or allergic to the pollen of a specific plant or groups of plants, such as ragweed-pollen, plantain-pollen, pollens of grasses or pollens of trees become afflicted with hay fever, if they inhale the specific pollen to which they are sensitive. Hitherto, injections of an extract of the specific pollen or pollens have been proposed as a remedy against hay fever, but in many cases these injections failed to show satisfactory results, and often dangerous shock-effects, so-called anaphylactic shocks, occurred as a result of said injections.

I discovered a harmless and efficient medium for the peroral treatment of hay fever in a therapeutical preparation, in which the principal effecting ingredient is a decomposition product of the protein of the pollen of at least one hay-fever-causing plant to which the patient is sensitive, said decomposition product being formed by the action of yeast on said pollen. Preferably, my therapeutical preparation comprises a fermented food product containing decomposition products of the protein of the pollen of at least one hay-fever-causing plant, said decomposition products being formed from the protein of the pollen by the action of proteolytic enzymes of yeast during the fermentation of said food product. If a person suffering from or being inclined to hay fever eats or drinks such a food product, the decomposition products of the protein of the specific pollen enter his system and protect him against hay fever caused by the specific pollen.

In order to prepare my new food product, I admix the pollen of a hay-fever-causing plant to the starting material or materials of the food product and subject the mixture thus obtained to a fermentation of proteolytic enzymes produced by yeast. The proteolytic enzymes attack the protein of the pollen and convert same into decomposition products of the protein, which remain in the food product intimately mixed with the other substances of the food product. If desired, a mixture of pollens of different hay-fever plants may be added to the preparatory mixture of the food product, so that the finished fermented food product contains the decomposition products of the protein of different specific pollens. Preferably, I admix worm-wood-pollen, ragweed-pollen, pollens of grasses, pollens of trees and/or plantain-pollen, but I may also use pollens of other plants, if it should be found that the pollen of another plant causes hay fever in a particular case. Instead of the pollen per se, a pollen extract may be added to the preparatory mixture for the food product prior to the fermentation thereof, or the flowers containing the pollen may be added, preferably said flowers being finely ground The food product may be a solid substance to be eaten or a beverage to be drunk. The pollen must not necessarily be admixed to the starting material, but it could be added to the preparatory mixture for the food product at any other proper phase prior to the fermentation. Preferably, the pollen or flowers containing pollen are added at a time, when a thorough mixing with the food substances is still possible, so that the enzymes may act in a very efficient manner on the pollen being in a finely divided state in the food materials. The earlier the pollen is added the longer the enzymes may act on the pollen.

According to my invention, for example, I may prepare a bread in the following manner: .01% to 1% of weight of ragweed pollen are added to flour and thoroughly mixed therewith. Then, yeast is added to this mixture and a dough is prepared in the usual manner and subjected to a fermentation, whereby the proteolytic enzymes of the yeast convert the protein component of the pollen or a part thereof into decomposition products of the protein of the pollen. Thereupon the bread is baked from this dough. The bread contains the decomposition products of the protein of the ragweed-pollen. Obviously, any other pollen or a mixture of different pollens could be admixed to the flour. In this manner, bread could be prepared which contains the decomposition products of the protein of the pollens of weeds, pollens of grasses or pollens of trees or a mixture thereof. Thus, a person sensitive to any one or several types of pollen may select a bread containing decomposition products of the protein of the particular pollen or of the proteins of all the pollens, to which he is sensitive.

As an example of a liquid food-product, I propose the addition of the pollens of a hay-fever-causing plant to the juice of grapes. The mixture thus obtained is subjected to fermentation, whereby the decomposition products of the protein of the pollens are formed, which are in the wine later on.

Furthermore, I may add pollen, pollen-extract, or flowers containing pollen of a hay-fever-causing plant to the starting materials of beer at any time before the fermentation. The beer thus produced will contain the desired decomposition products of the protein.

I have described preferred embodiments of my new food product and the method of making same, but it is clear that numerous changes and omissions may be made without departing from the spirit of my invention. For example, I could admix decomposition products of the protein of the pollen of a hay-fever-causing plant, which are separately produced, to a food product of any kind, or I could admix the pollen of at least one hay-fever-causing plant to a baking-powder, so that the protein of the pollen will be subjected to decomposition, when the baking-powder is added to a dough containing natural proteolytic enzymes, or I could add protein containing substances of another plant, which may cause any other allergic condition different from hay fever, to the starting materials or to a preparatory mixture for a fermented food product. Moreover, if desired, the pollen may be ground or opened-up in another manner prior to its addition to the preparatory mixture, so that the enzymes may attack still more efficiently the protein of the pollen during the fermentation.

What I claim is:

1. A therapeutical preparation for the peroral treatment of hay fever, in which the principal effecting ingredient is a decomposition product of the protein of the pollen of at least one hay-fever-causing plant and said decomposition product is formed by the action of yeast on said pollen.

2. A therapeutical preparation for the peroral treatment of hay fever, comprising a bread containing decomposition products of the protein of the pollen of at least one hay-fever-causing plant, said decomposition products being formed by the action of yeast on the pollen during the fermentation of the bread dough.

3. A therapeutical preparation for the peroral treatment of hay fever, comprising a fermented food product containing decomposition products of the protein of the pollen of at least one hay-fever-causing plant, said decomposition products being formed from the protein of the pollen by the action of proteolytic enzymes of yeast during the fermentation of said food product.

4. A method for the manufacture of a therapeutical preparation for the peroral treatment of hay fever, comprising the steps of adding the pollen of at least one hay-fever-causing plant selected from the group consisting of pollens of weeds, pollens of trees and pollens of grasses to the starting materials of a food product, and subjecting the mixture thus obtained to a fermentation by proteolytic enzymes produced by yeast.

5. A method for the manufacture of a therapeutical preparation for the peroral treatment of hay fever, comprising the steps of adding the extract of the pollen of at least one hay-fever-causing plant selected from the group consisting of pollens of weeds, pollens of trees, and pollens of grasses to the starting materials of a food product, and subjecting the mixture thus obtained to a fermentation by proteolytic enzymes produced by yeast.

KURT ROSENWALD.